(12) United States Patent
Burchfiel et al.

(10) Patent No.: US 6,944,127 B1
(45) Date of Patent: Sep. 13, 2005

(54) SYSTEM FOR DETECTING SPURIOUS NETWORK TRAFFIC

(75) Inventors: Jerry D. Burchfiel, Watertown, MA (US); Brig Barnum Elliott, Arlington, MA (US)

(73) Assignee: BBNT Solutions LLC, Cambridge, MA (US)

( * ) Notice: Subject to any disclaimer, the term of this patent is extended or adjusted under 35 U.S.C. 154(b) by 593 days.

(21) Appl. No.: 09/633,719

(22) Filed: Aug. 7, 2000

(51) Int. Cl.[7] .............................................. G01R 31/08
(52) U.S. Cl. ...................... 370/235; 370/428; 370/392
(58) Field of Search .............................. 370/218, 241.1, 370/243, 244, 242, 245, 339, 230, 236, 351, 370/401, 394, 392, 395.31, 428, 216, 389, 370/349, 352, 395, 31, 235; 709/299, 274, 709/238, 240, 249, 214, 258, 290; 713/201, 713/151, 154, 166, 168; 395/200.12

(56) References Cited

U.S. PATENT DOCUMENTS

| | | | | |
|---|---|---|---|---|
| 5,140,585 A | * | 8/1992 | Tomikawa | 370/354 |
| 5,477,547 A | * | 12/1995 | Sugiyama | 370/401 |
| 5,539,737 A | * | 7/1996 | Lo et al. | 370/401 |
| 5,610,905 A | * | 3/1997 | Murthy et al. | 370/401 |
| 5,649,108 A | * | 7/1997 | Spiegel et al. | 709/241 |
| 5,737,525 A | * | 4/1998 | Picazo et al. | 709/249 |
| 5,946,308 A | * | 8/1999 | Dobbins et al. | 370/392 |
| 6,023,563 A | * | 2/2000 | Shani | 709/249 |
| 6,104,696 A | * | 8/2000 | Kadambi et al. | 370/218 |
| 6,237,007 B1 | * | 5/2001 | Brown | 707/104.1 |
| 6,308,218 B1 | * | 10/2001 | Vasa | 709/238 |
| 6,308,220 B1 | * | 10/2001 | Mathur | 709/238 |
| 6,321,338 B1 | * | 11/2001 | Porras et al. | 713/201 |
| 6,446,131 B1 | * | 9/2002 | Khansari et al. | 709/238 |
| 6,510,154 B1 | * | 1/2003 | Mayes et al. | 370/389 |
| 6,522,656 B1 | * | 2/2003 | Gridley | 370/428 |
| 6,535,489 B1 | * | 3/2003 | Merchant et al. | 370/244 |
| 6,621,796 B1 | * | 9/2003 | Miklos | 370/236 |
| 6,665,733 B1 | * | 12/2003 | Witkowski et al. | 709/249 |
| 6,711,623 B1 | * | 3/2004 | Furukawa et al. | 709/249 |
| 6,731,596 B1 | * | 5/2004 | Chiang et al. | 370/217 |

\* cited by examiner

Primary Examiner—Bob Phunkulh
Assistant Examiner—Ian N. Moore
(74) Attorney, Agent, or Firm—Fish & Neave IP Group

(57) ABSTRACT

According to the principles of the invention, there is provided a system, apparatus, and method for detecting spurious network traffic. In a system according to the principles of the invention, a switch such as a router constructs a routing tree for each other switch connected thereto. When a network packet is received, the switch inspects the source address of the packet, and determines whether the forwarding switch or network interface could be expected to deliver a network packet from the indicated address. If it appears from this analysis that the network packet should not have come from the forwarding switch, then certain measures may be taken to address the situation. For example, the network packet may be dropped, an alarm may be generated to the forwarding switch, or an alarm may be generated to an automated or human network supervisor.

15 Claims, 4 Drawing Sheets

SYSTEM FOR DETECTING SPURIOUS NETWORK TRAFFIC

BACKGROUND OF THE INVENTION

1. Field of the Invention

This application relates to the field of networks, and more particularly to the field of data network traffic management.

2. Description of Related Art

Data networks may employ a number of routers to interconnect network terminals such as client devices, gateways to local area networks ("LAN's"), network resources, and the like. In data networks such as the Internet, routers are generally configured to exchange information with one another and to determine, on the basis of this messaging, routing tables for efficient routing between terminals.

One technique for developing routing tables is known as link state routing, in which each router transmits routing updates describing other routers and networks to which the router is connected. A commonly used standard for link state routing is the Open Shortest Path First ("OSPF") standard.

As a significant disadvantage, networks such as those using OSPF and similar link state routing algorithms/standards are generally vulnerable to spurious network packets, which are packets that include incorrect source addresses. Spurious network packets may result from transmission errors or intentional tampering. An error in source address information may result in inappropriate acknowledgements, or superfluous retransmission of data, both of which place additional demands on network resources. If the tampering is intentional and malicious, more serious security breaches may result, since an interloper may falsify the identity of another by systematically forging source address information.

There remains a need for a system to protect networks from spurious network packets.

SUMMARY OF THE INVENTION

According to the principles of the invention, there is provided a system for detecting spurious network traffic. In a system according to the principles of the invention, a switch such as a router constructs a routing tree for each switch connected thereto. When a network packet is received, the switch inspects the source address of the packet, and determines whether the forwarding switch or network interface could be expected to deliver a network packet from the indicated address. If it appears from this analysis that the network packet should not have come from the forwarding switch, then certain measures may be taken to address the situation. For example, the network packet may be dropped, an alarm may be generated to the forwarding switch, or an alarm may be generated to an automated or human network supervisor.

A method for detecting spurious network traffic according to the principles of the invention includes receiving a packet, the packet including data for transmission over a network. The method further includes determining an expected port for the packet, the expected port being a port upon which the packet is expected to be received. The method further includes determining an actual port for the packet, the actual port being the port upon which the packet is actually received. And, the method may include providing spurious packet handling when the actual port does not correspond to the expected port.

A switch for use in an internetwork according to the principles of the invention includes a plurality of ports, each port connected in a communicating relationship with at least one of a connected switch and a network and a routing database, the routing database containing information relating to the internetwork. The switch may include a processor, the processor configured to compare a first port to a second port, the first port being a one of the plurality of ports through which a packet is received and the second port being a one of the plurality of ports through which the packet is expected to be received, the processor further configured to provide spurious packet handling when the first port is different from the second port.

An internetwork according to the principles of the invention includes a plurality of switches such as the switch described above, whereby spurious network traffic within the internetwork may be detected.

BRIEF DESCRIPTION OF DRAWINGS

The foregoing and other objects and advantages of the invention will be appreciated more fully from the following further description thereof, with reference to the accompanying drawings, wherein.

DETAILED DESCRIPTION OF THE PREFERRED EMBODIMENT(S)

To provide an overall understanding of the invention, certain illustrative embodiments will now be described, including a system for detecting spurious network traffic on the Internet. However, it will be understood by those of ordinary skill in the art that the methods and systems described herein can be suitably adapted to any network that uses a link state routing protocol such as OSPF, or more generally to any network in which routing information or network topology information is generally available to nodes within the network. The principles of the invention are particularly applicable to those environments where forged network traffic may pose security or network resource problems.

Figure 1:
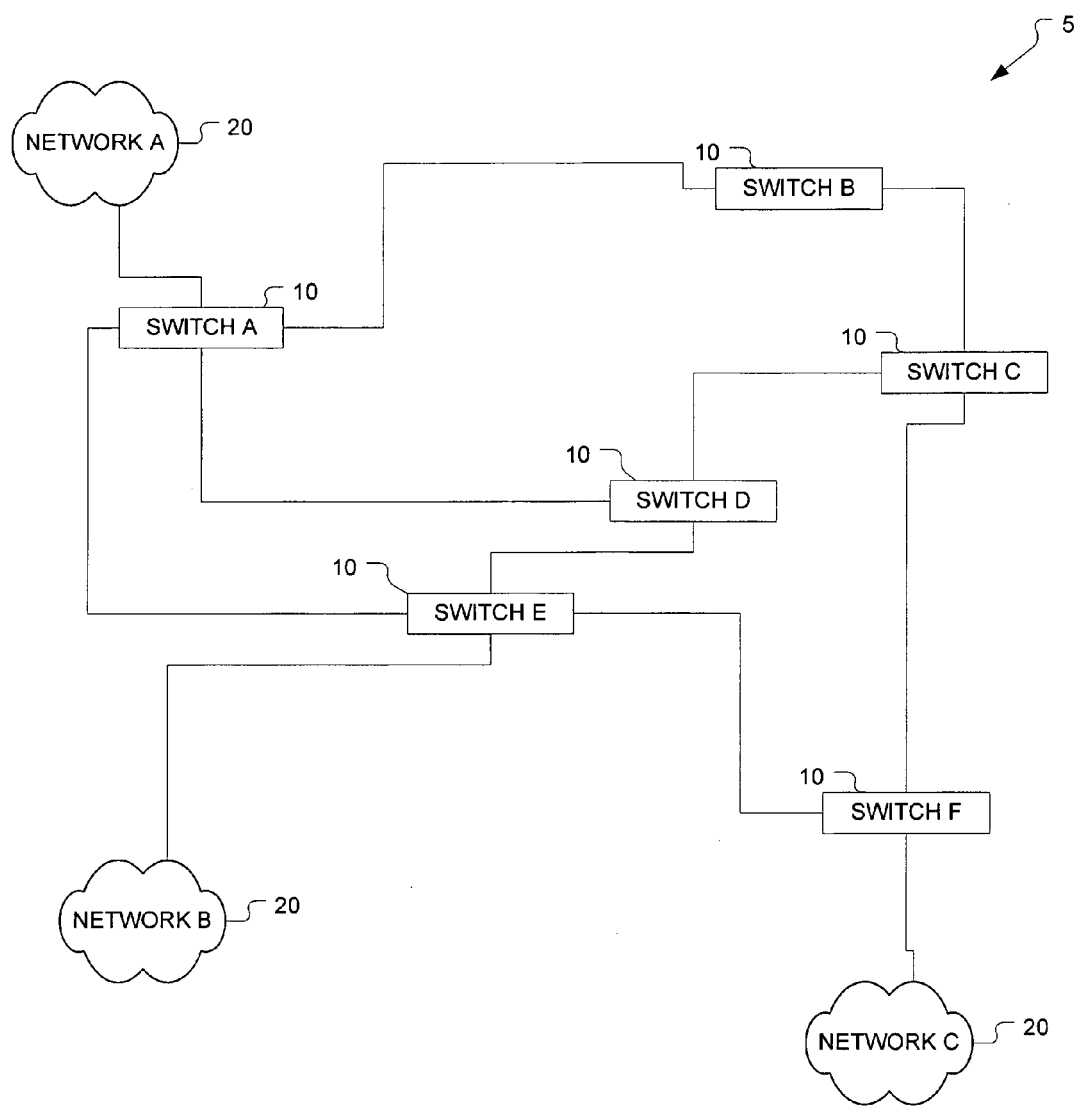
FIG. 1 shows an internetwork that may be used with the present invention.

FIG. 1 shows an internetwork that may be used with the invention. The internetwork 5 includes a plurality of switches 10 and a plurality of networks 20 interconnected by the switches 10. The switches 10 may include switches, routers, gateways, bridges, or any other network switching elements used to transfer network packets within the internetwork 5. The switches may be, for example, commercially available routers such as those manufactured by Cisco, Nortel Networks, or Lucent Technologies. Each switch 10 includes communication links to other switches 10 which may be operate over fiber optics, wires, coaxial cables, wireless links, or any other physical layer medium, and may use ports for any connection including Fast Ethernet, T1, T3, E3, ATM T3, ATM E3, ATM SMI3, MM3, or any other ports suitable for routing network traffic. Each switch 10 may include memory, one or more mass storage devices, and one or more processors programmed to monitor and manage network traffic, and to implement routing algorithms such as the Open Shortest Path First ("OSPF") protocol/algorithm, or any other routing protocol, including protocols based on shortest-path routing, flooding, flow-based routing, distance vector routing, link state routing, hierarchical routing, mobile host routing, broadcast routing, multicast routing, or some combination of these. A switch 10 may also include input and output devices for human operation thereof.

A network 20 may be any computer, collection of computers, or collection of computer networks that may be reached through a switch 10 connected thereto. One of the networks 20 may include one or more computers or other network devices that can operate as a source and/or destination of network packets, including, for example, a computer, a notebook or laptop computer, a workstation, an Internet appliance, a wireless access device, a kiosk, or any other device configured to send and/or receive Internet Protocol datagrams.

A network 20 may further include, for example, a gateway, a local area network ("LAN"), a wide-area network ("WAN"), or a virtual private network ("VPN"). A network 20 may be connected by, for example RS-232 connections, one or more Ethernet connections, or ATM networks. In an embodiment, each network 20 may be advertised by the connected switch 10, so that any traffic intended for computers or networks within the network 20 will be routed to the appropriate switch 10.

The switches 10 of FIG. 1 have been labeled A through F for purposes of the following discussion. The networks 20 of FIG. 1 have also been labeled A through C for purposes of the following discussion, and each network 20 may have networks connected to it. For example, network A may have networks A1, A2, and so on. While FIG. 1 illustrates a particular interconnection of the various switches 10 and networks 20, it should be understood that this only exemplary, and that other patterns of interconnections might be used in a particular network. Further, the pattern of connections may change during operation, for example to accommodate the introduction of new switches, or the removal or failure of existing switches 10. The internetwork 5 and networks 20 of FIG. 1 may be, for example, a portion of the Internet communicating using the Transport Control Protocol and the Internet Protocol ("TCP/IP").

Figure 2:
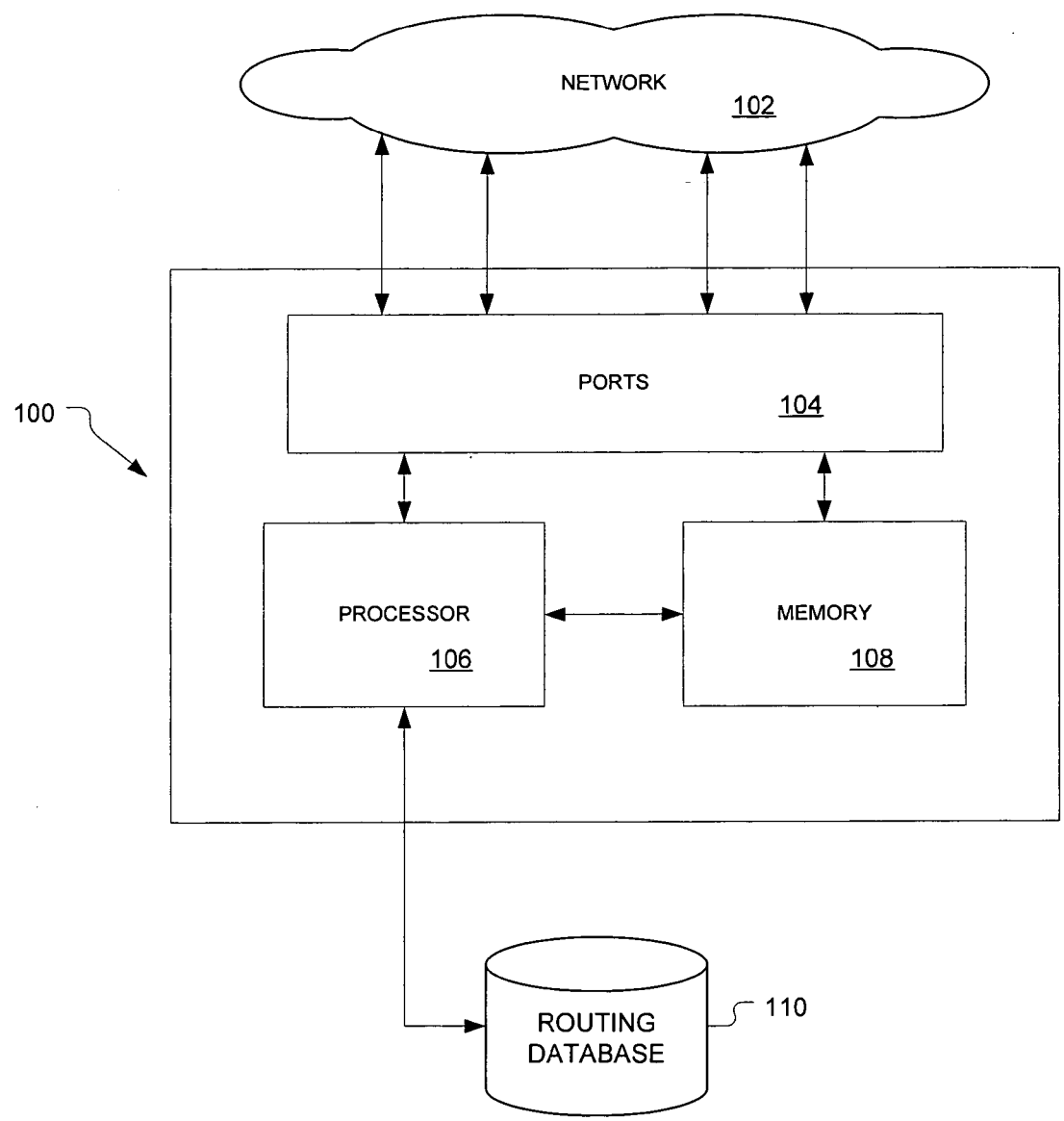
FIG. 2 is a block diagram of a switch according to the principles of the invention.

FIG. 2 is a block diagram of a switch according to the principles of the invention. The switch 100 includes connections to a network 102 through one or more ports 104, a processor 106, a memory 108, and a routing database 110. The network 102 may be any network or internetwork such as the internetwork 5 of FIG. 1, and the ports 104 may be connections to other switches 10, or to networks 20, or some combination of these. The processor may be any processor or combination of processors suitable to operation within a switch 10. The memory 108 may provide volatile or non-volatile storage of information such as one or more computer programs to control operation of the switch 10. The routing database 110 may reside within the switch 100, or may be external to the switch 100, such as with a mass storage device. The routing database 110 may store routing information received from the network 102, and any routing trees or other information calculated from the routing information.

When the switch 100 receives a network packet on one of the ports 104, the processor 106 on the switch 100 examines the destination address, and determines a suitable output port 104 such that the network packet will be forwarded to the destination address. As used below, the term "network packet" is intended to refer to packets carrying data between terminals in the internetwork 5, as distinguished from "routing packets" carrying descriptive network information between switches 20, such as the packets of FIGS. 3–4.

When the switch 100 receives a routing packet, the switch may store the routing packet, and may forward the routing packet to other switches 10 within the internetwork 5. The switch 100 may also generate its own routing packets that are transmitted to other switches 10 in the internetwork 5. These routing packets may be used to calculate routing trees that describe how network packets should be transmitted through the internetwork 5.

Figure 3:
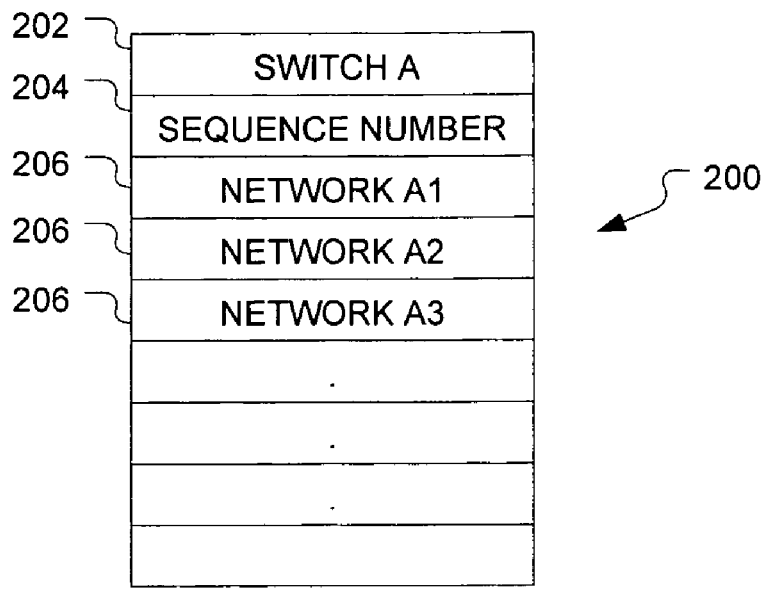
FIG. 3 shows a routing update packet that may be used with the invention.

FIG. 3 shows a routing update packet that may be used with the present invention. Each switch 10 may create routing update packets 200 and transmit the routing update packets 200 to other switches 10. Each switch 10 may also receive routing update packets 200 from other switches 10, and store and forward these routing update packets 200 as appropriate. The routing update packet 200 includes a switch identifier 202, a sequence number 204, and one or more network identifiers 206. The switch identifier 202 identifies the switch 10 for which the routing update packet 200 contains information. The sequence number 204 may be used to ensure that current routing information is not replaced by a stale routing update packet 200, i.e., a routing update packet 200 that has been superceded by a more recently created routing update packet 200, but that has been received at a later time. The one or more network identifiers 206 identify networks 20 connected to a switch 10. As shown in the example of FIG. 3, network A includes sub-networks A1, A2, A3, . . . , each of which may be reached through switch A. It will be appreciated that the routing update packet 200 of FIG. 3 is exemplary, and that variations to the routing update packet 200 are known to those skilled in the art and may be usefully employed with the present invention. The format of the routing update packet 200 will depend, for example, on the network protocol or protocols being used by the internetwork 5.

Figure 4:
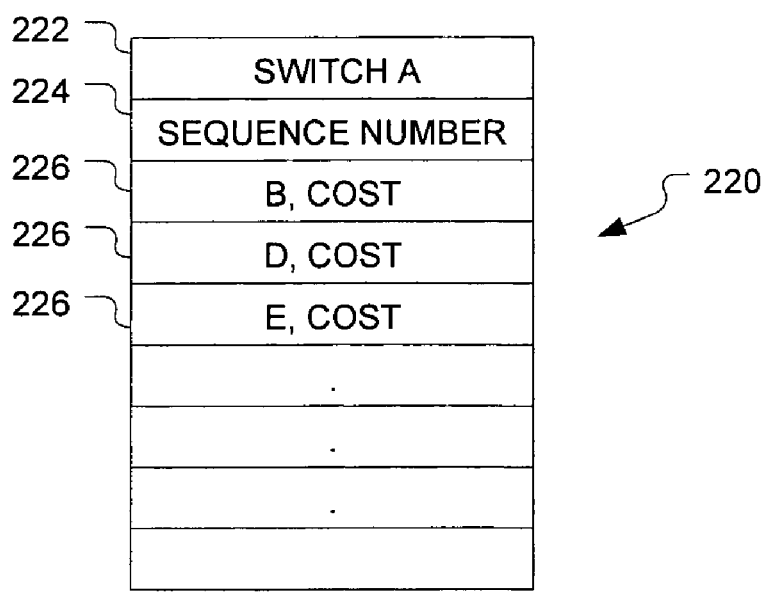
FIG. 4 shows a link state update packet that may be used with the invention.

FIG. 4 shows a link state update packet that may be used with the invention. The link state update packet 220 includes a switch identifier 222, a sequence number 224, and one or more connection identifiers 226. The switch identifier 222 identifies the switch 10 that created the link state update packet 220. The sequence number 224 may be used to ensure that current link state information is not replaced by any outdated, but later received, link state information. The one or more connection identifiers 226 include a switch name and a cost. The switch name identifies a switch 10 that is connected to one of the ports of the switch creating the link state update packet 220. The cost provides a metric for comparing connections to different switches 10, and may be determined with a calculation based on, for example, physical distance, latency, error rate, or data rate. It will be appreciated that the link state packet 200 of FIG. 4 is exemplary, and that variations to the link state packet 200 are known to those skilled in the art and may be usefully employed with the present invention. The format of the link state update packet 200 will depend, for example, on the network protocol or protocols being used by the internetwork 5.

In a link state routing system, each of the switches 10 in the internetwork 5 may collect information contained in link state update packets 220 and in routing update packets 200, and generate a routing tree that may be used to make routing decisions. The routing tree may be used to determine which switch 10 should receive a network packet in order for the network packet to reach an address within a particular network 20. The routing tree may also be used to choose an optimal path for reaching a switch 10 within the internetwork 5. According to the principles of the invention, a switch 10 may calculate routing trees for every switch 10 within the internetwork 5, and store each of these routing trees in the routing database 110.

Figure 5:
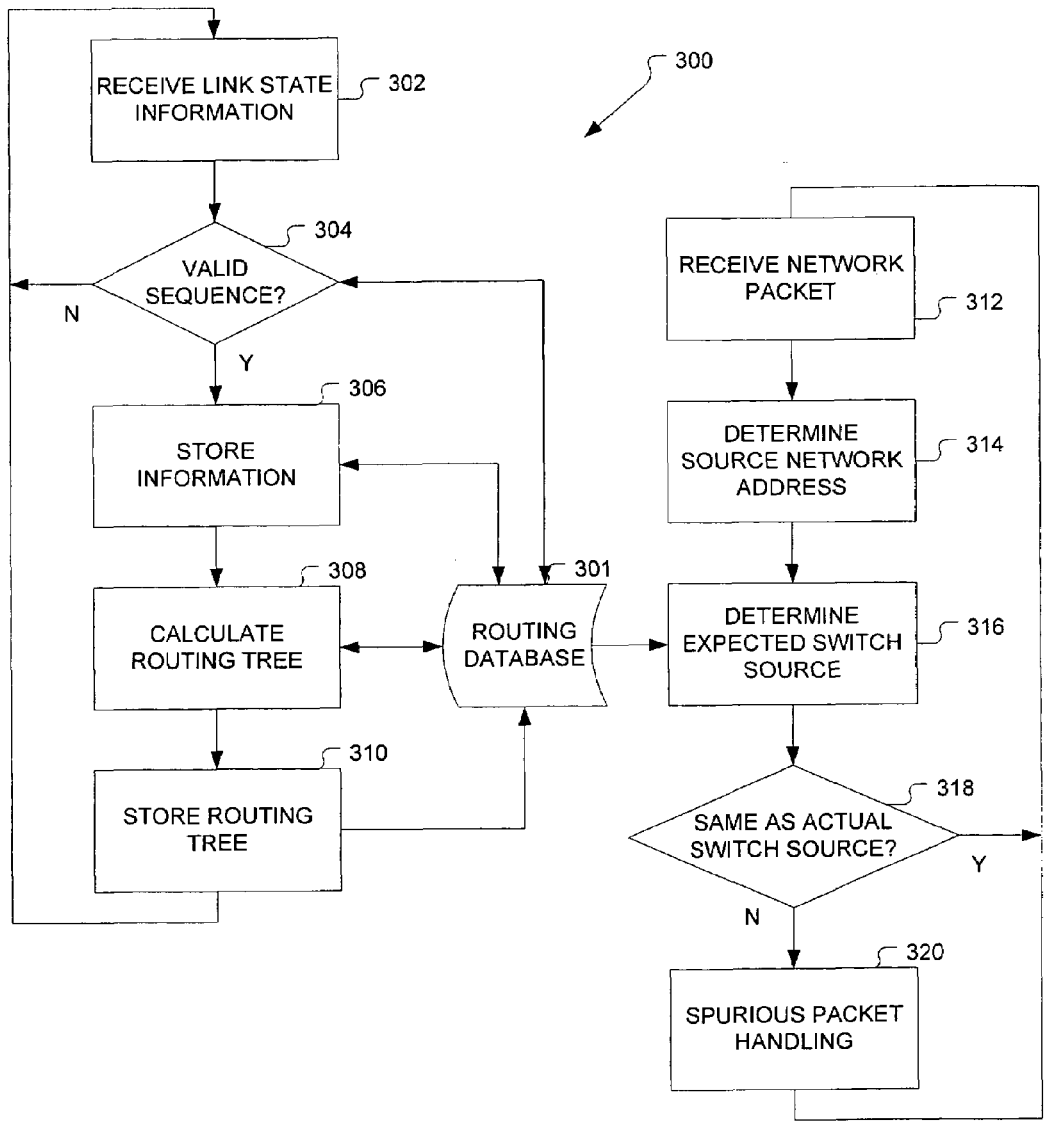
FIG. 5 is a flow chart illustrating a process according to the principles of the invention.

FIG. 5 is a flow chart illustrating a process according to the principles of the invention. The process may be performed within, for example, the switch 100 of FIG. 2, and may access a routing database 301, that may be the routing database 110 of FIG. 2. The process may be realized in software executing on the processor 106 of the switch 100, or may be realized in an application specific integrated circuit, programmable gate array, programmable logic array, or other dedicated or programmable device, general-purpose device, discrete logic devices, or some combination of these, all of which may also optionally operate as the processor 106 of the switch 100. For purposes of convenience, in the following discussion, references to "the switch 100" are intended to refer to the switch on which the process of FIG. 5 is being performed, while references to "the switch 10" are intended to refer to any other switch within the internetwork 5.

In one part of the process, routing trees are calculated and stored. In step 302, link state information is received. The link state information may be, for example, the routing update packet 200 of FIG. 3, or the link state update packet 220 of FIG. 4. In step 304, the sequence number of the link state information is check for validity. For example, previous link state information from the same switch may be retrieved from the routing database 301, and sequence numbers may be compared to ensure that the link state information in the received link state information is more current than the stored link state information. If the sequence number is not valid, i.e., the received link state information is stale, then the received link state information may be discarded, and the process returns to step 302 where new link state information is received.

If the sequence number is valid, then the process may proceed to step 306 where the received link state information is stored in the routing database 301. The received link state information then becomes the current link state information for the switch 10 in the internetwork 5 that generated the link state information.

In step 308, a routing tree is calculated using the link state information received in step 302. The routing tree may be calculated using any algorithm suitable for routing tree generation. For example, Dijkstra's algorithm may be run locally to construct the shortest possible path to all possible destinations from the switch 100. According to the principles of the invention, the switch 100 further generates routing trees from every other switch 10 within the internetwork 5. Other methods for constructing shortest paths are known and may be usefully practiced with the invention. As will be further appreciated by those skilled in the art, other protocols using different link state information may be adapted to use with the invention. For example, the Intermediate System-Intermediate System protocol may be used, and may be supplemented with hierarchical routing.

In step 308, the routing trees may optionally be used to calculate a reverse look-up table. In this table, each possible source network address within the internetwork 5 would be associated with a specific port of the switch 100, so that subsequent processing, as in step 316–318 below, may be performed using a table look up.

In step 310, any routing trees generated in step 308 are stored in the routing database 301, and the process may return to step 302 where new link state information may be received. Once link state information has been received from each switch 10 within the internetwork 5, a routing tree corresponding to each switch 10 may be calculated, and the routing database 301 may contain a complete view of the internetwork 5 including the networks 20 connected thereto. These routing trees may then be applied to network packets received at the switch 100 according to the principles of the invention. It will be appreciated that variations are possible. For example, in order to conserve resources, the switch 100 may only calculate routing trees for those switches 10 directly connected to the switch 100.

In step 312, a network packet is received at the switch 100. The network packet may be any packet or datagram carrying data for transportation on the internetwork 5, and the network packet is received on a particular port of the switch 100, referred to here as the "actual port", the actual port being connected to a corresponding port of another switch 10 within the internetwork 5, or to one of the networks 20 connected to the switch 100. The network packet may include a source network address and a destination network address. In step 314, the network packet is examined to determine the source network address.

In step 316, an expected switch source, or expected port, is determined using the routing trees stored in the routing database 301. More particularly, a routing tree for the switch 10 connected to the network 20 identified by the source network address is retrieved. Referring to FIG. 1, if, for example, the source network address in the network packet is from network A, then the routing tree for switch A is retrieved. It is then determined how switch A would route the network packet using its routing tree. If, again for example, the network packet is being examined at switch E, then the expected switch source would be switch A, since switch A is directly connected to switch E.

It will be appreciated that different approaches may be used to determine an expected switch source, and that in complex networks, there may be more than one expected switch source. Accordingly, the switch 100 may be configured to provide a set of expected switch sources for a given source network address. Optionally, the routing tables may be used to assign a probability or weight to each possible port within the set of expected switch sources.

In step 318, the expected switch source, or the expected port, is compared to the actual switch source, or the actual port, for the network packet. If the actual switch source is the same as the expected switch source, or one of the set of possible or likely switch sources, then the packet is forwarded according to the destination network address of the network packet, using the routing tree for the switch 100, as stored in the routing database 301. The process may then return to step 312 where a new network packet is received. If the actual switch source is not the same as the expected switch source, or is not one of the set of possible or likely switch sources, then the process may proceed to step 320 for spurious packet handling.

In step 320, the network packet is treated as a spurious network packet, and various handling options may be provided. The spurious network packet may be discarded. A record of the spurious network packet may optionally be stored in a spurious traffic log. An alert may optionally be generated to a monitoring center to inform the monitoring center of the spurious packet. The monitoring center may be a human operated station, or may be an automated station configured to automatically respond to spurious network traffic by, for example collecting alerts and attempting to locate a source of spurious network packets.

While the invention has been disclosed in connection with the preferred embodiments shown and described in detail, various modifications and improvements thereon will become readily apparent to those skilled in the art. It should be understood that all matter contained in the above description or shown in the accompanying drawings shall be interpreted as illustrative, and not in a limiting sense.

What is claimed is:

1. A method for detecting spurious network traffic comprising:
   receiving a packet, the packet including data for transmission over a network;
   calculating a plurality of possible ports at which the packet may have been received using a source network address of the packet, wherein each of the plurality of possible ports has associated therewith a weight, the weight relating to a likelihood that the packet would be received at the associated port;
   determining at which of the plurality of possible ports the packet would be expected to have been received based, at least in part, on the associated relative weights of each of the plurality of possible ports;
   determining at which an actual port for the packet was actually received;
   comparing the actual port to the expected port; and
   providing spurious packet handling in response to the actual port not corresponding to the expected port.

2. The method of claim 1 wherein spurious packet handling includes discarding the packet.

3. The method of claim 1 wherein spurious packet handling includes generating an alert.

4. The method of claim 1 wherein the packet comprises an Internet Protocol packet.

5. The method of claim 1 wherein calculating the plurality of possible ports comprises:
   determining a source network address for the packet; and
   calculating expected paths for the packet according to routing trees of switches in the network, wherein endings of the expected paths are the possible ports.

6. The method of claim 1 wherein determining an expected port for the packet comprises:
   generating a table, the table associating each one of a plurality of possible source network addresses with a possible port and a weight; and
   applying the table to determine the expected port.

7. A system for detecting spurious network traffic comprising:
   receiving means for receiving a packet;
   mapping means for calculating a plurality of possible ports from which the packet is expected to be received using a source network address of the packet, wherein each one of the plurality of possible ports has associated therewith a weight, the weight relating to a likelihood that the packet is received from the one of the plurality of possible ports;
   first determining means for determining an expected port for the packet based on relative weights of the possible ports;
   second determining means for determining an actual port for the packet;
   comparing means for comparing the expected port and the actual port; and
   handling means for providing spurious packet handling upon determining that the actual port does not correspond to the expected port.

8. A switch for use in an internetwork, the switch comprising:
   a plurality of ports, each port connected in a communicating relationship with at least one of a connected switch and a network;
   a routing database, the routing database containing information relating to the internetwork; and
   a processor, the processor configured to compare a first port of the plurality of ports through which a packet is received to a second port of the plurality of ports through which the packet is expected to be received, the processor further configured to provide spurious packet handling upon determining that the first port is different from the second port, and configured to generate an expected port table, the expected port table mapping each of a plurality of possible source network addresses to a plurality of possible ports of the switch, whereby a plurality of possible second ports are calculated by using a source network address of the packet, wherein each one of the plurality of possible second ports has associated therewith a weight, the weight relating to a likelihood that the packet is received from the one of the plurality of possible second ports.

9. The switch of claim 8 wherein the routing database includes a routing tree for each one of a plurality of connected switches.

10. The switch of claim 8 wherein the routing database includes a plurality of link state update packets and a plurality of routing update packets.

11. The switch of claim 8 wherein the second port is calculated by examining one or more routing trees stored in the routing database.

12. The switch of claim 8 wherein the second port is calculated by examining a source network address of the packet.

13. The switch of claim 8 wherein the spurious network traffic handling includes discarding the packet.

14. The switch of claim 8 wherein the spurious network traffic handling includes generating an alert.

15. An internetwork comprising a plurality of switches, each of the switches comprising:
   a plurality of ports, each port connected in a communicating relationship with at least one of a connected switch and a network;
   a routing database, the routing database containing information relating to the internetwork; and
   a processor, the processor configured to compare a first port of the plurality of ports through which a packet is received to a second port of the plurality of ports through which the packet is expected to be received, the processor further configured to provide spurious packet handling upon determining that the first port is different from the second port, and configured to generate an expected port table, the expected port table mapping each of a plurality of possible source network addresses to a plurality of possible ports of the switch whereby a plurality of possible second ports are calculated by using a source network address of the packet, wherein each one of the plurality of possible second ports has associated therewith a weight, the weight relating to a likelihood that the packet is received from the one of the plurality of possible second ports;
   whereby spurious network traffic within the internetwork is detected.

* * * * *

UNITED STATES PATENT AND TRADEMARK OFFICE
CERTIFICATE OF CORRECTION

PATENT NO.    : 6,944,127 B1
DATED         : September 13, 2005
INVENTOR(S)   : Burchfiel et al.

It is certified that error appears in the above-identified patent and that said Letters Patent is hereby corrected as shown below:

Column 7,
Line 20, replace the word "assoicated" with -- associated --.
Line 22, replace the words "determining at which an actual port for" with the words -- determining an actual port at which --.

Signed and Sealed this

Eighth Day of November, 2005

JON W. DUDAS
*Director of the United States Patent and Trademark Office*